(12) United States Patent
Rigollet et al.

(10) Patent No.: US 9,009,927 B2
(45) Date of Patent: Apr. 21, 2015

(54) AUTOMATICALLY TRIGGERED TIGHTENING SYSTEM FOR AN ELASTIC CLAMPING COLLAR

(75) Inventors: Nicolas Rigollet, Romorantin (FR); Fabrice Prevot, Selles sur Cher (FR); Tony Rointru, Marcilly en Gault (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 878 days.

(21) Appl. No.: 12/668,728

(22) PCT Filed: Jul. 11, 2008

(86) PCT No.: PCT/FR2008/051305
§ 371 (c)(1),
(2), (4) Date: Jul. 29, 2010

(87) PCT Pub. No.: WO2009/010698
PCT Pub. Date: Jan. 22, 2009

(65) Prior Publication Data
US 2010/0287740 A1    Nov. 18, 2010

(30) Foreign Application Priority Data
Jul. 12, 2007  (FR) .................................. 07 56441

(51) Int. Cl.
  *F16B 2/06*    (2006.01)
  *F16L 33/03*   (2006.01)
  *F16L 37/088*  (2006.01)
(52) U.S. Cl.
  CPC ............... *F16L 33/03* (2013.01); *F16L 37/088* (2013.01)

(58) Field of Classification Search
  CPC ... F16L 37/0925; F16L 37/091; F16L 37/002; F16L 27/12; F16L 33/222; F16L 33/221; F16L 33/225
  USPC .............. 24/270, 483, 484; 403/109.1, 109.5, 403/110; 285/243, 244, 252, 257, 322
  See application file for complete search history.

(56) References Cited

U.S. PATENT DOCUMENTS

| 1,694,664 | A |   | 12/1928 | Parker |
| 4,005,883 | A | * | 2/1977  | Guest ............................ 285/322 |
| 4,804,213 | A | * | 2/1989  | Guest ............................ 285/308 |
| 4,946,213 | A | * | 8/1990  | Guest ............................. 285/31 |

(Continued)

FOREIGN PATENT DOCUMENTS

| EP | 0175808 | 4/1986 |
| FR | 2738616 | 3/1997 |

(Continued)

*Primary Examiner* — Robert J Sandy
*Assistant Examiner* — Rowland Do
(74) *Attorney, Agent, or Firm* — Kilpatrick Townsend & Stockton LLP

(57) ABSTRACT

The system comprises a clamping collar (10) suitable for being brought resiliently from its rest configuration in which its diameter is small to an expanded configuration. The system further comprises a support ring (20) suitable for being encircled by the collar, and an expander (40) suitable for co-operating with the ring firstly to hold the ring in an expanded configuration in which the collar (10) encircling the ring is also in its expanded configuration when the expander and the ring are in a first relative position, and secondly to enable the ring to contract and the clamping system to tighten under the resilient return force exerted by the collar encircling the ring when the expander and the ring are in a second relative position.

6 Claims, 7 Drawing Sheets

(56) References Cited

U.S. PATENT DOCUMENTS

| | | | |
|---|---|---|---|
| 5,222,555 A * | 6/1993 | Bridges | 166/208 |
| 5,370,423 A * | 12/1994 | Guest | 285/39 |
| 5,443,289 A * | 8/1995 | Guest | 285/39 |
| 5,853,198 A * | 12/1998 | Richied et al. | 285/41 |
| 5,915,738 A * | 6/1999 | Guest | 285/24 |
| 6,102,446 A * | 8/2000 | Thomas | 285/148.19 |
| 6,343,772 B1 * | 2/2002 | Oi | 248/75 |
| 6,648,071 B2 * | 11/2003 | Hackworth et al. | 166/207 |
| 6,749,233 B2 * | 6/2004 | Ohya | 285/322 |
| RE38,786 E * | 8/2005 | Guest | 285/24 |
| 7,090,257 B2 * | 8/2006 | Werth | 285/243 |
| 7,093,808 B2 * | 8/2006 | Yuzuriha et al. | 248/62 |
| 7,168,486 B2 * | 1/2007 | Hackworth et al. | 166/242.6 |
| 7,922,212 B2 * | 4/2011 | Werth | 285/243 |
| 8,056,937 B2 * | 11/2011 | Guest | 285/319 |
| 8,062,366 B2 * | 11/2011 | Melkent | 623/17.11 |
| 8,197,546 B2 * | 6/2012 | Doubler et al. | 623/17.15 |
| 8,256,802 B2 * | 9/2012 | Werth | 285/243 |
| 8,267,431 B2 * | 9/2012 | Okuno et al. | 285/86 |
| 2002/0000721 A1 * | 1/2002 | Ohya | 285/322 |
| 2003/0193190 A1 * | 10/2003 | Werth | 285/243 |
| 2003/0204943 A1 * | 11/2003 | Geurts | 29/237 |
| 2004/0195831 A1 * | 10/2004 | Ohya | 285/242 |
| 2004/0218982 A1 * | 11/2004 | Wentworth et al. | 405/184.3 |
| 2008/0169646 A1 * | 7/2008 | Werth | 285/243 |

FOREIGN PATENT DOCUMENTS

| | | |
|---|---|---|
| GB | 885227 | 12/1961 |
| GB | 2371574 | 7/2002 |
| WO | WO 99/09344 | 2/1999 |

* cited by examiner

AUTOMATICALLY TRIGGERED TIGHTENING SYSTEM FOR AN ELASTIC CLAMPING COLLAR

This application is a National Stage of International Application No. PCT/FR2008/051305 filed Jul. 11, 2008, which claims priority to French application No. 0756441, filed Jul. 12, 2007, the disclosure of both applications are incorporated herein by reference in their entirety.

The present invention relates to a clamping system comprising a clamping collar having a belt suitable for taking up a rest configuration in which the diameter of said belt is small for clamping purposes, and an expanded position in which the diameter of the belt is increased so as to enable the collar to be put into place around a part to be clamped, it being possible for the belt to go from its expanded configuration to its rest configuration by elastic deformation.

A clamping collar of this type is very simple to use because, starting from its expanded configuration, merely enabling it to go into its rest configuration suffices for it to be tightened automatically.

For example, the collar is made from a spring-forming strip material that is looped in such a manner as to have two axially overlapping ends that are suitable for being moved relative to each other so as to reduce the overlap length and so as to bring the collar from its rest configuration to its expanded configuration. Under these circumstances, the collar is placed in its expanded configuration by holding its ends so that they are at an appropriate distance from each other and, in order to perform the tightening, said ends are released so that the collar reaches its rest configuration.

In general, the collar is held in its expanded configuration by holding the two ends of the collar, e.g. by means of a tool of the pliers type or indeed by means of a removable staple. Once the collar is in place around the article(s) to be clamped, the operator must release the tool or remove the staple, in order to enable the collar to go into its rest position.

It can be difficult to place the collar correctly around the article(s) to be clamped, while also holding it in its expanded position.

An object of the invention is to make it easier to fit the collar, by proposing a clamping system that makes it easier to put the collar into place around the article(s) to be clamped and to cause the collar to go from its expanded configuration into its rest configuration, once the collar is in place around the article(s) to be clamped.

This object is achieved with the clamping system of the invention by the fact that it further comprises a device for putting the collar into place, which device comprises a support ring suitable for being encircled by the collar, and an expander suitable for co-operating with said ring firstly to hold the ring in an expanded configuration in which the collar encircling the ring is also in its expanded configuration when the expander and the ring are in a stable first relative position, and secondly to enable the ring to contract and the clamping system to tighten under the resilient return force exerted by the collar encircling the ring when the expander and the ring are in a second relative position.

Thus, in order to put the collar into place, said collar is placed around the support ring, while said support ring is held in its expanded configuration by the expander. The first relative position of the expander and of the support ring is a stable position, i.e. so long as they are not subjected to external drive, these two elements remain naturally in this position that is necessary for holding the collar in the expanded configuration. In order to achieve the clamping, it suffices then for the assembly comprising the collar, the support ring, and the expander, which assembly can be handled as a whole, to be put into place around the article(s) to be clamped, and then for the expander and the ring to be caused to go into their second relative position, in such a manner as to enable the clamping to take place.

With the invention, the collar does not encircle the article(s) to be clamped directly (it is not in direct contact therewith), but rather it encircles the support ring and clamps the article(s) via the clamping force that it imparts to said ring by constraining it to contract.

Advantageously, the support ring and the expander are suitable for being moved axially relative to each other so as to go from one to the other of said first and second relative positions, said axial movement preferably being effected in the direction in which the expander penetrates into the ring.

Such an axial movement can be effected simply and easily.

Advantageously, for clamping an assembly of two parts that are engaged one in the other, the support ring and the expander each have an abutment surface suitable for co-operating with a respective one of the two parts so that relative movement of said parts for engaging one in the other, while the clamping system is disposed around one of said parts, causes the support ring and the expander to go from their first relative position to their second relative position. The two abutment surfaces are preferably shoulders, provided respectively on the support ring and on the expander.

Under these circumstances, the movement that serves to cause the ring and the expander to go from their first relative position to their second relative position can follow on from the movement for mutually engaging the two parts that are clamped by means of the collar. In particular, by means of the above-described abutment surfaces, the clamping system of the invention can be placed around one of the two parts while being set axially relative to this part while the two parts are being engaged one in the other. At the end of the mutual engagement, the two parts can no longer move relative to each other, but by continuing to move them relative to each other in the engagement direction, it is possible to cause the ring and the expander to go from their first relative position to their second relative position, thereby causing the collar to tighten.

Advantageously, for clamping an assembly of two parts engaged one in the other, one of the two elements formed by the support ring and by the expander has a holding portion suitable for being disposed on one of the two parts of the assembly so as to make it possible to hold the clamping system relative to said part, before said part is assembled with the other part. This holding portion makes it possible to pre-assemble the system of the invention with one of the parts, prior to connecting together the two parts. Thus, the part in question and the pre-assembled clamping system can be transported and handled as a whole, before the two parts are engaged one in the other.

Advantageously, the support ring has at least one axial wall sector defined by an axial slot and the expander has at least one spreader head suitable for being inserted into said slot so as to spread apart the edges of said slot and so as to hold the ring in its expanded configuration.

Under these circumstances, advantageously, the slot has a wide segment and a narrow segment that are disposed one after the other in the axial direction, and the spreader head is suitable for co-operating with the narrow segment to hold the ring in its expanded configuration and to co-operate with the wide segment so as to enable the ring to contract.

The contact surfaces over which the axial slot and the spreader head are in contact are angularly positioned in such a manner as to hold the expanded configuration of the ring stable. In particular, said surfaces are angularly positioned axially.

It is also advantageous for the spreader head to be formed on an axial stave that has a thin portion suitable for co-operating with the narrow segment of the slot while the spreader head is co-operating with the wide segment.

Under these circumstances, the support ring and the expander can be engaged one in the other with the spreader head(s) of the expander being disposed in the axial slot(s) of the support ring. Merely moving the support ring and the expander axially relative to each other makes it possible to move the spreader head relative to the slot in such a manner as to allow the ring to go into its contracted configuration.

The invention also relates to a device for putting a clamping collar into place on a part to be clamped.

An object of the invention is to propose such a device that makes it easier for a collar as indicated above to be tightened automatically.

To this end, according to the invention, the device for putting a collar into place comprises a support ring suitable for being encircled by the collar, and an expander suitable for co-operating with said ring firstly to hold the ring in an expanded configuration in which the collar encircling the ring is also in its expanded configuration in which the diameter of the collar is increased to enable said collar to be put into place around the part to be clamped when the expander and the ring are in a stable first relative position, and secondly to enable the ring to contract when the expander and the ring are in a second relative position.

The invention can be well understood and its advantages appear more clearly on reading the following detailed description of embodiments of the invention shown by way of non-limiting example. The description refers to the accompanying drawings, in which.

Figure 1:
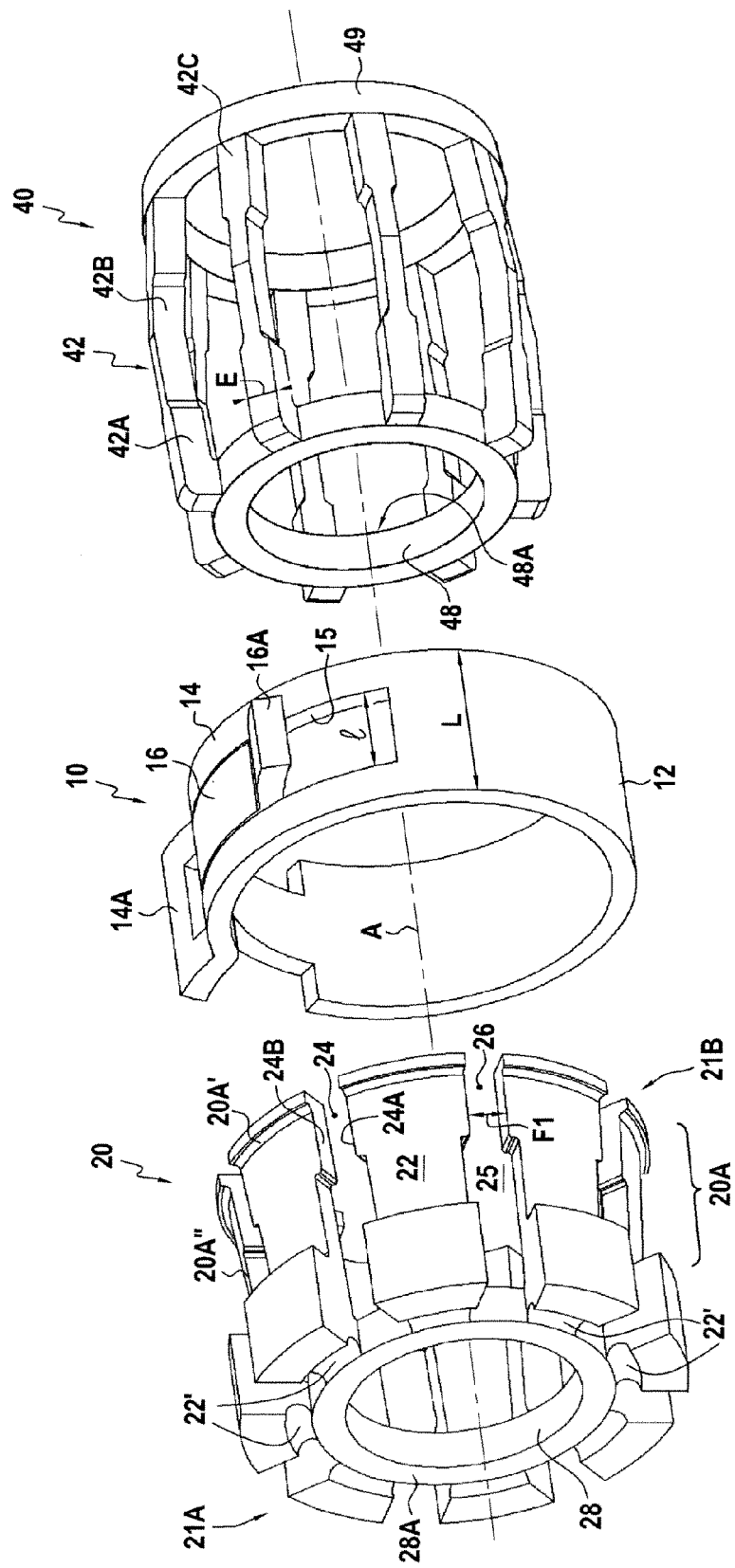
FIG. 1 is a perspective view of a clamping system of the invention, showing the support ring, the expander, and the collar as separated from one another in a first embodiment.

FIG. 1 shows a clamping collar 10 that comprises a belt 12 looped over more than a full turn, and two ends 14 and 16 that overlap each other axially. In other words, there exists at least one plane containing the axis A of the belt (which axis defines the axial direction), in which a section intersects both of the ends 14 and 16. In this example, the end portion 14 has a width that corresponds to the width L of the collar as measured parallel to the axis A, but has an internal slot 15, whereas the end portion 16 has a width corresponding to the width l of the internal slot 15, and therefore penetrates into said slot. The free ends 14A and 16A of said end portions 14 and 16 are raised slightly relative to the cylindrical surface defined by the belt 12. In its rest configuration (shown in FIG. 1), the belt 12 of the collar is of small diameter. In order to cause the belt to go into its expanded configuration, it is necessary to bring the two free ends 14A and 16A closer to each other, in such a manner as to increase the inside diameter of the belt.

The clamping system shown in FIG. 1 further includes a support ring 20 and an expander 40. As can be understood more clearly by referring to FIGS. 2 and 3, the support ring is suitable for being encircled by the collar. More precisely, it has a cylindrical zone 20A around which the collar can be disposed. In order to facilitate axially setting the collar relative to the ring, said cylindrical zone is defined at each of its two opposite ends by shoulders 20A' and 20A". It can be seen that the support ring 20 is made up of a plurality of axial wall sectors 22 that are defined by axial slots 24.

Figure 2:
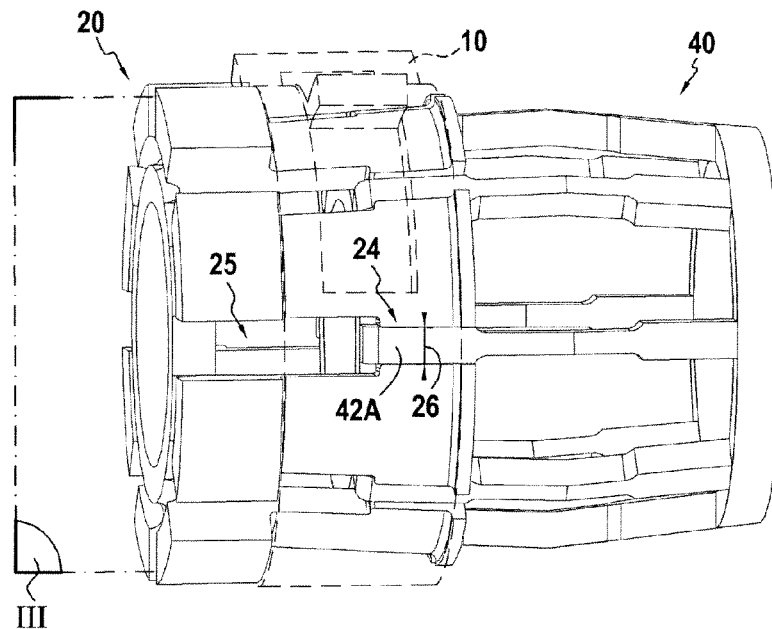
FIG. 2 is a perspective view of the clamping system, while the collar (shown in dashed lines) is disposed around the support ring that is held in the expanded configuration by the expander.
Figure 3:
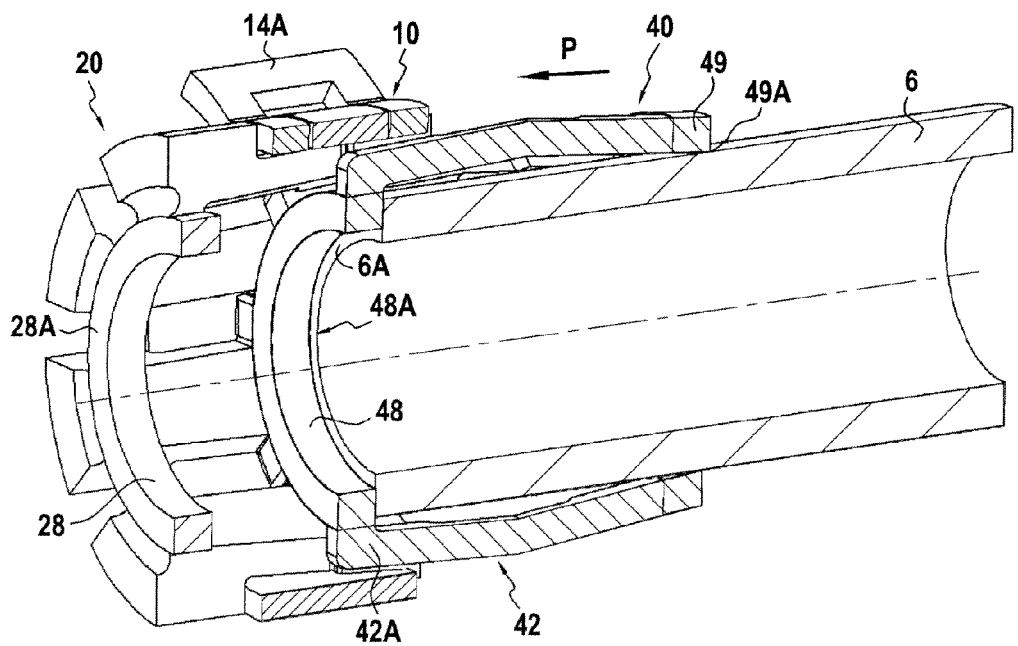
FIG. 3 is an axial section view on plane III of FIG. 2, showing the same clamping system in the same position, while the end of a pipe has been inserted into the expander.

The expander 40 has axial staves 42 carrying spreader heads 42A of thickness E, as measured in the circumferential direction around the axis A, that is greater than the smallest dimension F1 of the width of a slot 24, also as measured in the circumferential direction. With reference to FIGS. 2 and 3, it can be seen that, when a spreader head 42A is inserted into a slot 24, said spreader head can thus spread apart the edges 24A and 24B of the slot, thereby increasing the diameter of the ring 20. In other words, inserting a spreader head 42A into a slot 24 can cause the support ring 20 to expand.

In this example, the ring 20 is made up of eight mutually identical angular sectors of an axial wall that are separated by eight mutually identical axial slots, one axial slot being disposed between two adjacent sectors. Similarly, the expander 40 has eight spreader heads 42A distributed angularly in correspondence with the angular distribution of the slots 24 of the ring 20. Thus, when the ring 20 and the expander 40 are moved axially relative to each other, the spreader heads 42 can be inserted into the slots 24 in order to spread apart the facing edges of the respective slots, and thereby in order hold the ring in the expanded configuration.

It should be noted that, in this example, although it is advantageous to make provision for the slots of the ring and for the spreader heads to be distributed angularly in uniform manner, provision may be made for some other distribution to be implemented.

Similarly, in order to distribute the clamping force, it is advantageous for the support ring to be made up of a plurality of axial wall sectors. However, it may be made up of a single axial wall sector extending over slightly less than 360°, a slot being provided between the two facing edges. Under these circumstances, the expander has a spreader head suitable for coming to spread the slot in order to hold the ring in its expanded configuration.

Figure 4:
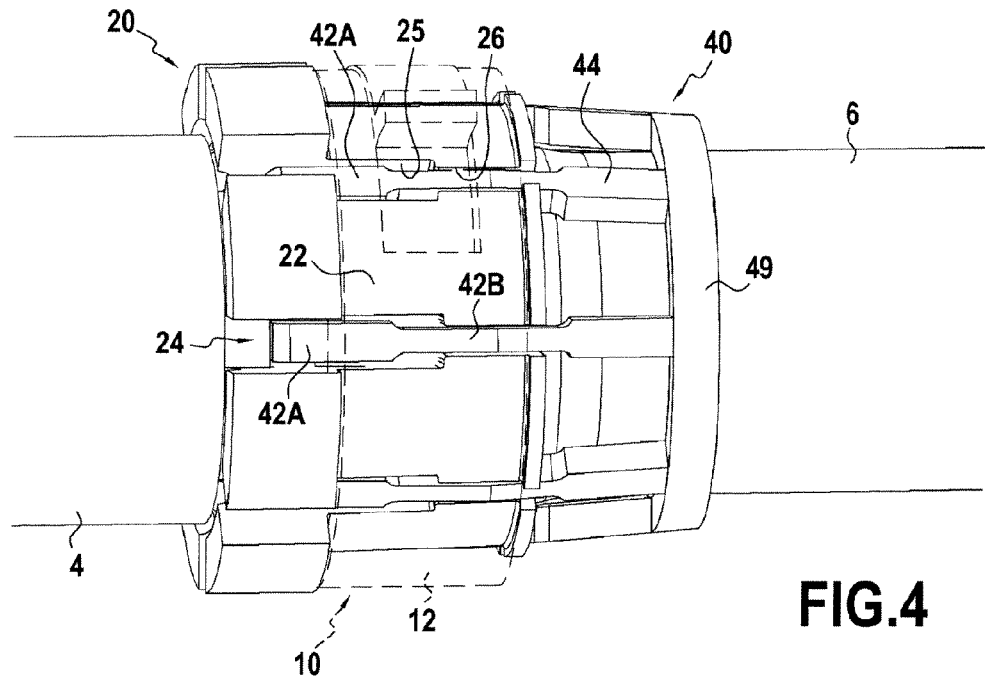
FIG. 4 is a view analogous to FIG. 2, showing a situation in which the support ring and the expander are in their second relative position, so that the ring is in its contracted configuration.
Figure 5:
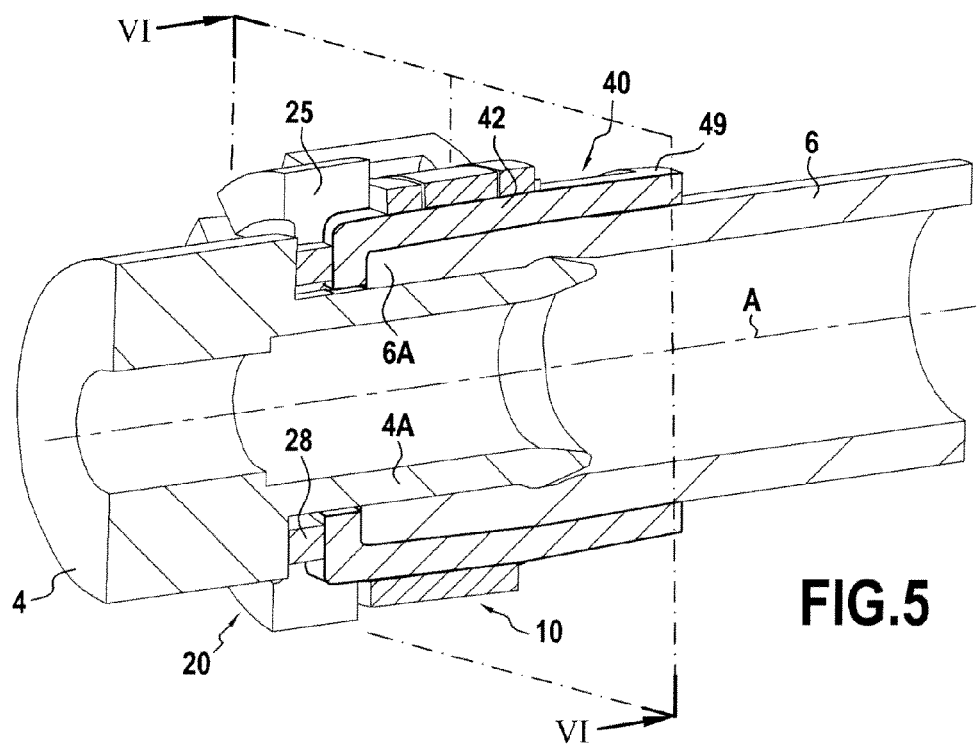
FIG. 5 is a view corresponding to FIG. 3, with the system in the same configuration as in FIG. 4.

It can be seen in the figures that each of the slots 24 has a wide segment 25 and a narrow segment 26 that are disposed one after the other in the axial direction. In FIGS. 3 and 4, the spreader heads 42A co-operate with the narrow segments 26 of the axial slots 24, and thereby hold the ring 20 in its expanded configuration. Those surfaces of the narrow segments 26 and of the spreader heads that are in mutual contact are chosen so that said contact is self-stable. In particular, as can be seen in the figures, said surfaces are purely axial. In addition, they are long enough to generate friction forces that are sufficient for ensuring the above-mentioned self-stability. It is possible to choose to equip them locally with complementary snap-fastening means so as to generate a hard spot, holding their relative positions corresponding to the first relative position of the ring and of the expander. In FIGS. 4 and 5, the expander and the support ring have been moved axially relative to each other so that the spreader heads have reached the wide segments 25 of the slots 24, thereby enabling the ring 20 to contract under the effect of the clamping force exerted by the collar that encircles the portion 20A of said ring. More precisely, in FIGS. 4 and 5, it is thin portions 42B of the axial staves 42 that find themselves in the narrow segments 26 of the slots 24, so that the thin segments do not oppose the ring going into its contracted configuration.

Thus, in the example shown, it is merely by axial movement, i.e. by movement in translation effected parallel to the axis A of the belt of the collar that the clamping system can be activated. This axial movement causes the support ring and the expander to go from their first relative position to their second relative position, in which the ring is no longer expanded, so that the belt of the collar can be brought resiliently towards its rest configuration while causing the ring to contract. Naturally, the relative widths of the narrow portions 26 of the slots 24 and of the thin portions 42B of the staves 42 are determined so that said staves do not oppose the ring contracting over an amplitude sufficient to enable the collar to be tightened.

It is possible to make provision for each of the slots to have a single portion whose edges are spread apart by the presence, between them, of the spreader heads, and for the relative movement of the ring and of the expander to cause the spreader heads to move out of the slots.

The various axial wall sectors 22 of the ring are interconnected via a link band 28 situated on that side 21A of the ring that is opposite from its side 21B via which the spreader heads 42 are inserted into the slots 24. It can also be noted that, in this example, the slots open out axially on said side 21B so as to make it easier for the spreader heads to be inserted into said slots.

The radial face of said band 28 that faces towards the side 21A of the ring forms an abutment surface 28A (a shoulder) for a part such as an end-piece 4 onto which a pipe 6 is to be engaged. More precisely, as can be seen in FIG. 5, said end-piece 4 has an end segment 4A that is engaged inside the band 28, while an outer shoulder of the end-piece comes into abutment against the shoulder 28A at the end opposite from the free end 21B of the ring 20.

It can be noted that the ring 20 is provided with recesses 22' in the link zone via which the wall sectors 22 are connected to the band 28, thereby increasing the flexibility of said link and making it easier for the wall sectors to pivot as the ring is going from its expanded configuration to its contracted configuration.

It can also be seen in FIG. 5 that the thin portions 42B of the staves 42 have bent towards the axis A under the effect of the clamping force exerted by the collar.

The expander 40 also has a band 48 to which the axial staves 42 are connected, in the region of their spreader heads 42A. On its side that faces backwards relative to the direction P in which the spreader heads penetrate into the slots 24, this band 48 has an abutment surface 48A suitable for co-operating with the free end 6A of a pipe 6 inserted into the expander. It can be understood that, during the movement whereby the pipe is engaged over the end portion 4A of the end-piece, the pipe and the end-piece 40 entrain with them the expander 40 and the support ring 20 in their relative axial movement. Thus, engaging the pipe on the end-piece causes the expander 40 and the support ring 20 to move axially from their first relative position to their second relative position. In principle, the end-piece 4 can be stationary in a fixed position, whereas the pipe 6 is moved in the penetration direction P in which the expander penetrates into the ring.

It is advantageous for the clamping system of the invention to be carried at the end of one of the two engagement parts. In this example, the assembly made up of the expander 40, of the collar 10, and of the support ring 20 is carried at the end of the pipe 6, i.e. the expander 40, the collar 10, and the support ring 20 as assembled together are pre-assembled with the pipe by being carried by the end thereof.

To this end, the expander 40 has a holding portion 49 that is disposed on the pipe so as to enable the clamping system to be held relative to the pipe, before the pipe is assembled onto the end-piece. In this example, the holding portion 49 is formed in a region of the expander 40 that is opposite from the spreader heads 42A. In particular, the holding portion is constituted by a second band 49 of inside diameter adapted to match the outside diameter of the pipe, while optionally being slightly smaller than said outside diameter, so that, at the end of the movement whereby the pipe is engaged in the expander 40, said expander is held around the pipe, without being able to move easily relative thereto.

Thus, in order to put the assembly into place, it is possible to place the collar 10 around the portion 20A of the ring 20 and to put the expander into place by inserting the spreader heads 42A into the narrow portions 26 of the slots 24. This movement can be facilitated if the collar is held in the expanded configuration. The end of the pipe 6 is then inserted into the expander, until the free end 6A of said pipe comes into abutment against the abutment surface 48A. It is thus possible to obtain a pipe that is pre-equipped with the clamping system of the invention, with which it can be delivered to the fitters who then merely have to engage the assembly over an end-piece 4 by exerting an engagement axial thrust force that is high enough to cause the expander 40 to move in the engagement direction relative to the ring 20, so as to cause the spreader heads 42A to come out of the narrow portions 26 of the slots 24.

In this example, the two opposite axial ends of the expander are formed by respective ones of the bands 48 and 49. The axial staves 42 extend between the two bands and, in the direction going from the band 49 to the band 48, each of them has, in succession, a relatively wide attachment base 42C, the above-mentioned thin portion 42B, and the spreader head 42A that is connected to the band 48. It should be noted that the spreader heads are connected to the outside periphery of the band 48, so that the shoulder surface 48A defines a diameter less than the diameter that is defined by a cylinder lying within the inside peripheries of the spreader heads 42A. Conversely, via their inside peripheries, the attachment bases 42C define a cylinder having substantially the same diameter as the band 49. It should be noted, however, that, on its free edge 49A, the band 49 has an edge that is inclined inwards (towards the axis A), so as to facilitate anchoring said free edge onto the outside periphery of the pipe 6.

It should be noted that the axial slots 24 extend at least over the axial segment 20A of the support ring 20 that is covered by the belt of the collar when said belt encircles the ring; the wide segment 25 of the axial slot extends even beyond said axial segment 20A. In reality, the axial slots 24 pass axially through the ring 20 and are also radially through slots over almost all of their lengths, except for the end portions at which the band 28 is situated.

Figure 6:
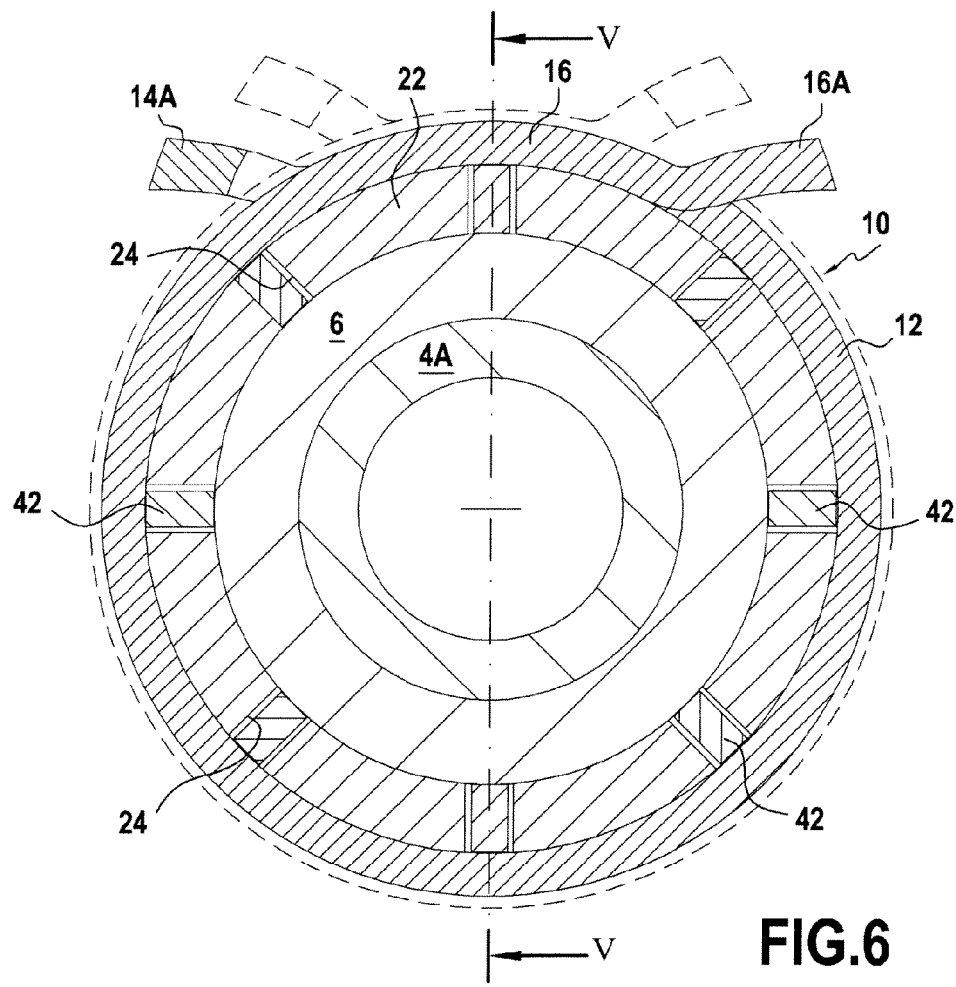
FIG. 6 is a section view on plane VI-VI of FIG. 5.

In FIG. 6, the eight axial staves 42 of the expander 40 can be seen clearly, each one of them being situated in a respective slot 24 of the support ring 20. Thus, an axial wall sector 22 of said ring extends between two consecutive staves 24. In this example, the spreader heads are in wide portions of the slots (see FIG. 5) so that the collar can be in its clamping position. The appearance of the collar when it is in its expanded configuration, i.e. when the spreader heads 42A are in the narrow portions of the slots, is indicated in dashed lines.

It can be observed in this figure that the inside axial peripheries of the thin portions 42B of the staves 42 and of the wall sectors 22 are in contact with the pipe 6 when the collar is tightened. Insofar as the width of the thin portions of the staves is adapted to match the width of the narrow portions of the slots (ignoring clearance enabling the clamping to be effective), the clamping system thus bears almost continuously against the pipe.

Figure 7:
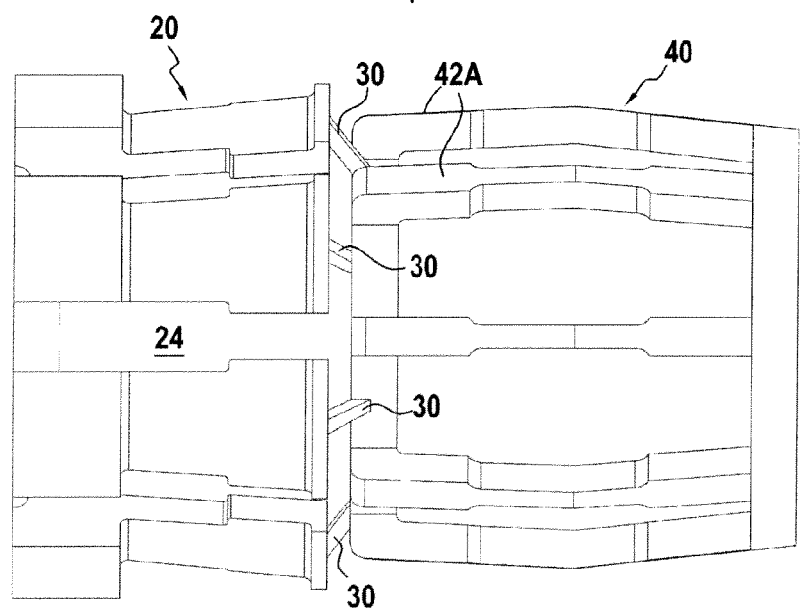
FIG. 7 is view of the assembly comprising the support ring and the expander in an example for the first embodiment.

The support ring 20 and the expander 40 are described above in the form of two distinct parts. As shown in FIG. 7, these two elements may however be in the form of a single, common part. Thus, FIG. 7 shows a ring 20 and an expander 40 that are analogous to those of the preceding figures, and that are interconnected via link pieces 30. The part comprising the ring 20, the link pieces 30, and the expander 40 may be made of an integrally molded plastics material by injection molding. In order to assemble the expander 40 and the support ring 20 with a view to holding the ring in its expanded configuration, the spreader heads 42 must be inserted into the narrow portions of the axial slots 24. For this purpose, the link pieces 30 may either be broken or be bent axially. The link pieces may be constituted merely flexible link webs that are of sufficient length. It should be noted that, in particular, the link pieces 30 offer the advantage of pre-positioning the spreader heads 42A in register with the slots 21.

The second embodiment is described below reference to FIGS. 8 to 11. The collar 10 and the support ring 20 are identical to the corresponding elements used in the first embodiment. The expander 50 differs very slightly from the expander 40. In particular, as can be seen in FIG. 9, the axial staves 52 extend forwards, i.e. in the penetration direction in which said staves penetrate into the slots 24 in the ring 20, from the band 49 that is identical to the band 49 of the expander 40 of FIGS. 1 to 7. The width e (as measured in the circumferential direction) of the staves 50, over the entire fraction of their length that is designed to come into the slots, corresponds to no more than substantially the smallest width F1 of the slots 24. Thus, the thin portion 52B extends over almost the entire length of the staves except, in this example, for the attachment base portions 52C via which the staves are attached to the ring 49. The spreader heads 42A are formed by wide blocks carried by the ends of the staves 52. These blocks have a width E as measured in the circumferential direction that is greater than the above-mentioned width e, thereby enabling them to hold said ring in its expanded configuration when they are in the narrow portions of the slots 24 in the ring 20. In addition, it can be observed that the blocks also project radially relative to the outside peripheries of the staves 52. Thus, as can be understood, in particular, by examining FIG. 8, it is the blocks 52A that are disposed against the edges of the slots 24 when the spreader heads are inserted into said slots, whereas the outside peripheries of the staves 52 find themselves substantially at the same level as the axially innermost periphery of the ring 20. In this second embodiment, the abutment surface 58A of the expander 50 is formed on the radially innermost face of each of the free ends 58 of the staves 52 that are opposite from the band 49, which free ends are curved radially inwards. Considered together, the curved free ends 58 of the staves 50 define band portions, whose inside faces define the abutment surface 58A for the free end of the pipe that is to be inserted into the expander 50. In general, the abutment surface of the expander serving as an axial abutment for one of the two parts that are to be engaged one in the other is advantageously formed over at least a band portion of the expander that is situated in the region of the spreader head. Similarly, the abutment surface of the support ring serving as an abutment for the other part of the assembly is advantageously formed over at least a band portion of the support ring that is situated in the vicinity of an end of the axial wall sector opposite from the expander.

Figure 8:
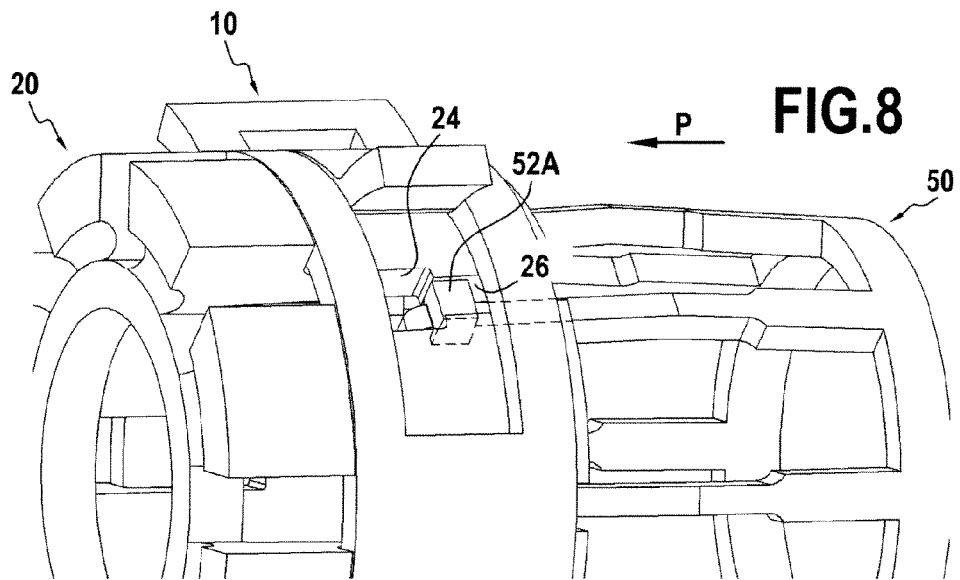
FIG. 8 is a fragmentary perspective view corresponding to FIG. 2, for a second embodiment.
Figure 9:
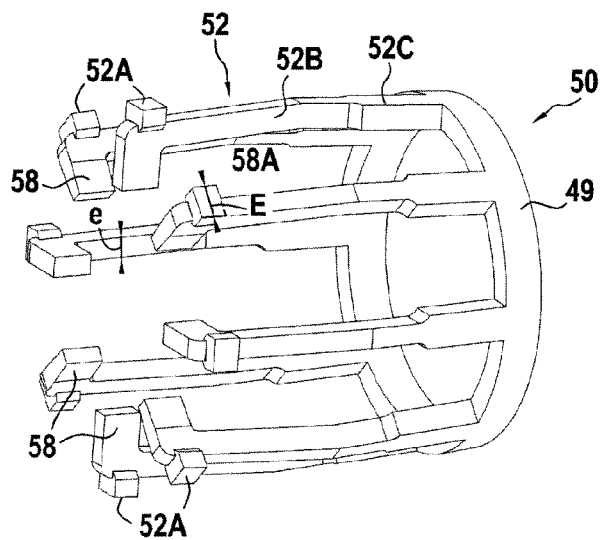
FIG. 9 is a perspective view of the expander used in this second embodiment.
Figure 10:
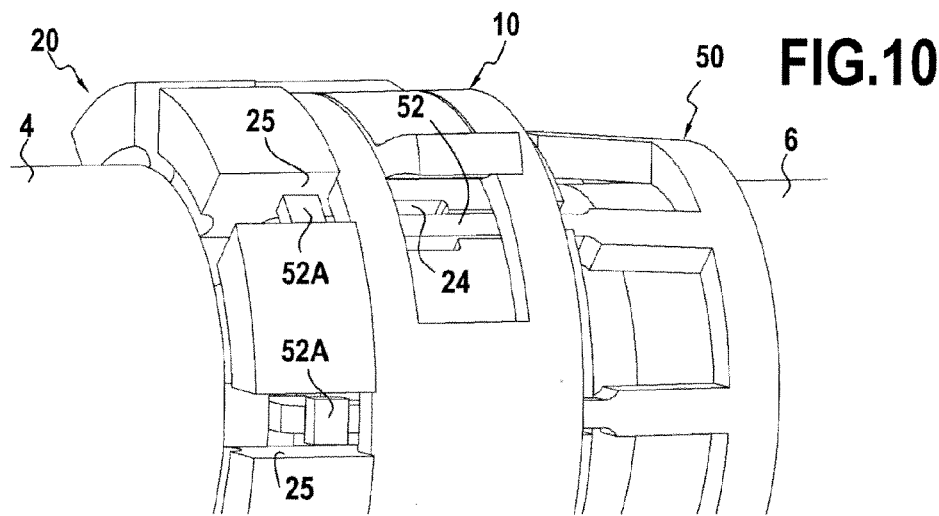
FIG. 10 is a fragmentary perspective view showing the clamping system of the second embodiment in the same configuration as in FIG. 4.
Figure 11:
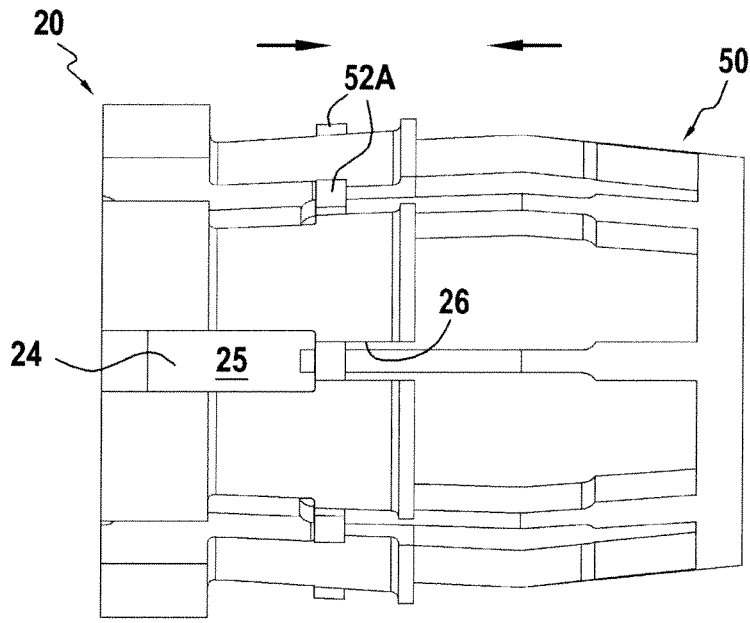
FIG. 11 is a view of the assembly comprising the support ring and the expander in an example for the second embodiment.

FIG. 8 shows the second embodiment of the clamping system, while the ring 20 is held in its expanded configuration by the expander, the spreader heads 52A being situated in the narrow portions 26 of the slots 24. In FIG. 10, the ring and the expander have been moved in the direction in which the spreader heads are caused to penetrate further into the slots 24. The spreader heads 52A have then reached the wide segments 25 of the slots 24, thereby enabling the ring 20 to contract under the resilient clamping force of the collar, so as to enable the assembly comprising the two parts to be clamped by means of the clamping system. It should be noted that the wide segment 25 of the axial slot 24 extends beyond the axial segment 20A (see FIG. 1) of the ring 20 that is designed to be encircled by the collar, said wide segment extending beyond said axial segment over a length sufficient to accommodate the spreader heads 52A outside said axial segment when the expander and the ring shown in FIG. 10 are in the second relative position. The expander 50 and the ring 20 may be made in the form of independent parts. However, as shown in FIG. 11, these two elements can also be made in the form of a single, common part, the two portions of which that are constituted respectively by the expander and by the ring being connected together via breakable or deformable link webs. In particular, FIG. 11 shows that the ring 20 and the expander 11 are connected together in the region in which the spreader heads 52A co-operate with the narrow segments 26 of the slots 24. Advantageously, said link is sufficiently weak for relative axial movement of the two elements 20 and 50 in the direction indicated by the arrows of FIG. 11 to make it possible to break said link and to cause the spreader heads 52A to advance into the wide portions 25 of the slots 24.

A description of a third embodiment of the invention is described below with reference to FIGS. 12 and 13. This third embodiment differs from the preceding embodiments by the shaping of the expander 60 and by the fact that it is inserted via the other axial end of the ring 20'. It can be seen that the expander 60 has axial staves 62 that extend axially from a link band 64. At their free ends opposite from the band 64, said staves 62 have wide portions forming spreader heads 62A, while thin portions 62B are situated between the spreader heads 62A and the links via which the staves are connected to the band 64.

Insofar as the slots 24 in the ring 20' are axially through slots, the axial staves 62 are inserted into said slots from the same side as the band 28 unlike in the above-described embodiments. Under these circumstances, in order to assemble a pipe and an end-piece by engaging them one in the other, the staves 62 are inserted into the slots 24 until the spreader heads 62A find themselves in the narrow segments 26 of the slots 24'. It should be noted that, if this insertion is achieved by moving the ring and the expander axially and relative to each other, provision is advantageously made for the transition between the inlet axial segments 25' of the slots and the narrow segments 26 to be softened relative to the shoulders 25'A shown in FIGS. 12 and 13. The end segments 25A of the slots 24' that are opposite from the band 28 are formed by wide segments of dimensions such that, once the spreader heads 62A are disposed in said end segments, contraction of the ring is finished.

Figure 12:
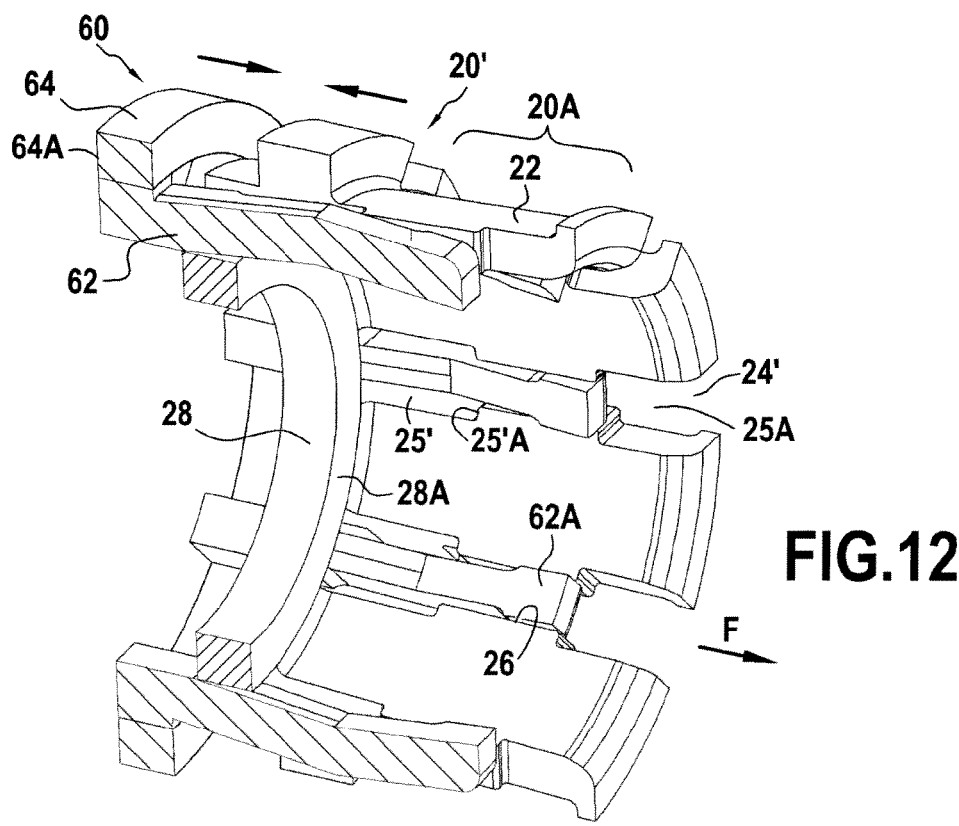
FIG. 12 is a perspective view that is cut away in a diametrical plane showing the assembly comprising the support ring and the expander in a third embodiment.
Figure 13:
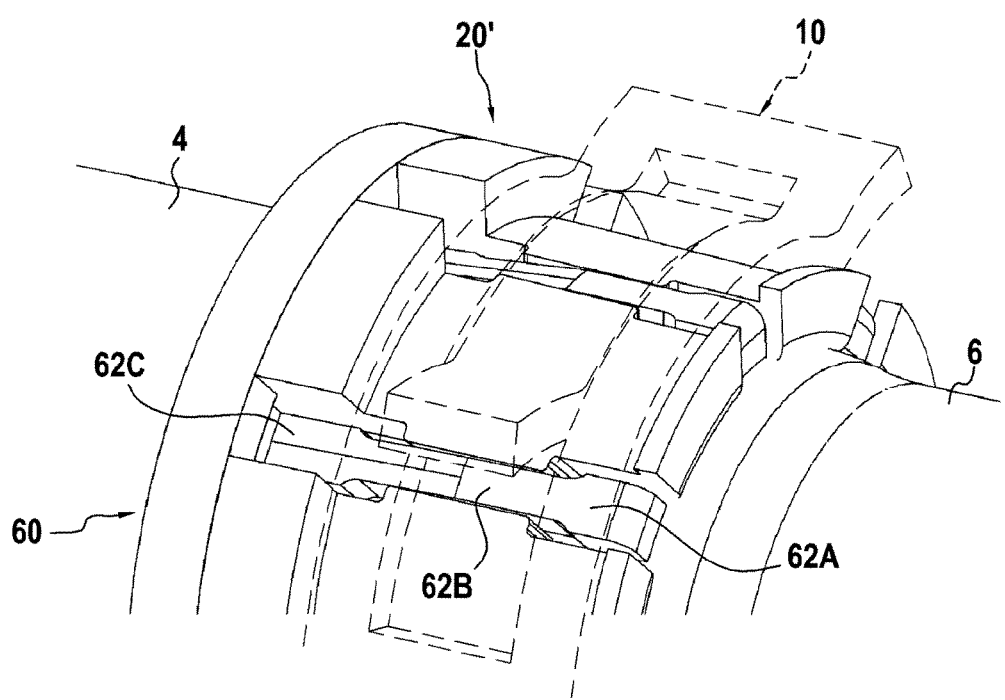
FIG. 13 is a view showing the assembly in this third embodiment, with a collar (in dashed lines), while the collar is in the tightened state.

Thus, in order to achieve the mutual engagement of the two above-mentioned parts, it is possible to put the pipe into place inside the ring 20' while said ring is held in its expanded configuration by means of the spreader heads co-operating with the narrow segments of the slots 26, and then the end-piece is brought to the same side as the band 60 in such a manner as to insert the end portion of said end-piece into the band 60 and into the band 28, in the direction F indicated in FIG. 12. In this situation, the free end of the pipe co-operates with the abutment surface 28A formed by the radially innermost face of the band 28, whereas the shoulder of the end-piece co-operates with the abutment surface formed by the radially outermost face 64A of the band 64. It then suffices to continue the engagement movement by moving the end-piece and the pipe even closer together, in order to cause the ring 20' and the expander 60 to move axially and relative to each other as indicated by the opposing arrows of FIG. 12, in such a manner as to bring the spreader heads 62A of the staves into the wide end segments 25A of the slots, thereby enabling the ring to contract. It can be observed that, in this embodiment, the abutment surface 64A of the expander is opposite from the spreader heads 62A. It can be seen in FIG. 13 that, when the expander 60 and the ring 20' are in the second relative position, the bases 62C of the staves via which said staves are attached to the band 64 find themselves in the wide inlet segments 25' of the slots 24, so that only the thin regions 62B of said staves find themselves in the thin segments of the slots, in such a manner as to enable the ring to contract.

The support ring and the expander are advantageously made by injection molding. For example, the material used is fiberglass-filled polyamide 66.

As indicated above, the collar is preferably made of a resilient material. The resilient material is advantageously constituted by spring steel.

The invention claimed is:

1. A clamping collar placement device for placing a clamping collar, said clamping collar placement device comprising:
   a resilient support ring having an at-rest diameter less than that of the clamping collar so as to enable placement of the resilient support ring within the clamping collar and an expanded diameter sufficient to expand the clamping collar to a diameter greater than a diameter of a part to be clamped, wherein the resilient support ring comprises at least one axial wall section defined by an axial slot; and
   an expander operatively connectable to said resilient support ring, wherein the expander is configured to exert a force on the resilient support ring causing the resilient support ring to expand from the at-rest diameter to attain the expanded diameter and wherein the expander comprises at least one spreader head configured to be inserted into said axial slot so as to spread apart the edges of said axial slot and so as to hold the resilient support ring in an expanded position, wherein the spreader head is formed on an axial stave that comprises a thin portion configured to cooperate with a narrow segment of the axial slot while the spreader head is cooperating with a wide segment.

2. The clamping collar placement device according to claim 1, wherein the resilient support ring and the expander are configured to be moved axially relative to each other so as to go from one to the other of an at-rest position and the expanded position.

3. The clamping collar placement device of claim 2, wherein the axial movement is performed in a direction resulting in the expander penetrating into the resilient support ring.

4. The clamping collar placement device according to claim 1, wherein the wide segment and the narrow segment of the axial slot are disposed one after the other in the axial direction, and wherein the spreader head is configured to cooperate with the narrow segment to hold the resilient support ring in the expanded position and further to cooperate with the wide segment to enable the resilient support ring to contract toward the at-rest diameter.

5. The clamping collar placement device according to claim 1, wherein the axial slot and the spreader head are in contact on contact surfaces that are arranged so that said contact holds the resilient support ring in the expanded position.

6. The clamping collar placement device according to claim 5, wherein said contact surfaces comprise axial surfaces extending parallel to an axis of the resilient support ring.

* * * * *